United States Patent [19]

Chen et al.

[11] Patent Number: 5,798,132
[45] Date of Patent: Aug. 25, 1998

[54] PROCESS FOR APPLYING A FLAVORED COATING TO A FOOD PRODUCT

[75] Inventors: Weizhi Chen; Saiyad Salahuddin Ahmad, both of Dallas, Tex.

[73] Assignee: Recot, Inc., Pleasanton, Calif.

[21] Appl. No.: 668,072

[22] Filed: Jun. 17, 1996

[51] Int. Cl.$^6$ .................. A21D 15/08; A23B 4/10; A23B 9/14

[52] U.S. Cl. .................. 426/305; 426/89; 426/93; 426/94; 426/302; 426/309

[58] Field of Search .................. 426/94, 92, 243, 426/302, 552, 553, 554, 652, 89, 296, 658, 555, 578, 305, 93, 309

[56] References Cited

U.S. PATENT DOCUMENTS

| | | | |
|---|---|---|---|
| H1053 | 5/1992 | Coffey et al. | 426/573 |
| 3,615,676 | 10/1971 | McKowa et al. | 99/83 |
| 3,769,027 | 10/1973 | Mangiere et al. | 99/1 |
| 4,208,442 | 6/1980 | Evans et al. | 426/296 |
| 4,218,485 | 8/1980 | Lee et al. | 426/296 |
| 4,293,572 | 10/1981 | Silva et al. | 426/19 |
| 4,496,601 | 1/1985 | Rispoli et al. | 426/554 |
| 4,508,576 | 4/1985 | Mudde | 106/213 |
| 4,511,583 | 4/1985 | Olson | 426/89 |
| 4,518,620 | 5/1985 | Monagle et al. | 426/291 |
| 4,562,079 | 12/1985 | Herzing | 426/94 |
| 4,588,600 | 5/1986 | Suderman | 426/555 |
| 4,645,674 | 2/1987 | Lang et al. | 426/94 |
| 4,675,197 | 6/1987 | Banner et al. | 426/292 |
| 4,738,865 | 4/1988 | Morris | 426/658 |
| 4,755,392 | 7/1988 | Banner et al. | 426/555 |
| 4,762,721 | 8/1988 | Holscher et al. | 426/94 |
| 4,767,635 | 8/1988 | Merritt et al. | 426/272 |
| 4,822,626 | 4/1989 | Spanier et al. | 426/94 |
| 4,877,629 | 10/1989 | Stypula et al. | 426/302 |
| 4,910,028 | 3/1990 | Bernacchi et al. | 426/93 |
| 4,927,645 | 5/1990 | Lee | 426/93 |
| 4,935,251 | 6/1990 | Verhoef et al. | 426/94 |
| 4,943,438 | 7/1990 | Rosenthal | 426/92 |
| 4,965,081 | 10/1990 | Lazarus | 426/242 |
| 5,093,146 | 3/1992 | Calandro et al. | 426/619 |
| 5,194,271 | 3/1993 | Yasosky | 426/92 |
| 5,225,222 | 7/1993 | Cha et al. | 426/89 |
| 5,258,197 | 11/1993 | Wheeler et al. | 426/607 |
| 5,296,245 | 3/1994 | Clarke et al. | 426/49 |
| 5,308,636 | 5/1994 | Tye et al. | 426/573 |
| 5,403,600 | 4/1995 | Reutimann et al. | 426/89 |
| 5,421,838 | 6/1995 | Gosset et al. | 44/577 |
| 5,424,085 | 6/1995 | Hsieh et al. | 426/289 |
| 5,451,420 | 9/1995 | Brain et al. | 426/573 |
| 5,565,227 | 10/1996 | Mason et al. | 426/96 |

*Primary Examiner*—James C. Housel
*Assistant Examiner*—Phuong T. Bui
*Attorney, Agent, or Firm*—Rothwell, Figg, Ernst & Kurz

[57] ABSTRACT

The present invention involves the preparation of a starch-based food product coating containing a mixture of seasoning and liquid and dry ingredients that is applied on the product and subsequently dried to provide a smooth flavor coating on the exterior of the product. The coating comprises a mixture of water, at least one edible oil, at least one native starch, at least one seasoning and, optionally, edible protein and an emulsion stabilizer. The present invention further involves a process for preparing such a coating, comprising disbursing the starch in warm water, adding the edible oil to the starch and water mixture, preparing an oil-in-water emulsion from the mixture, adding at least one seasoning to the emulsion, and mixing the resulting composition at a low speed that ensures uniform distribution of solid particles within the composition while minimizing incorporation of air bubbles. The present invention further provides a process for preparing a coated food product, comprising applying to a food product a flavorful coating composition of the present invention and subjecting the resulting food product to a two-stage drying process.

18 Claims, No Drawings

PROCESS FOR APPLYING A FLAVORED COATING TO A FOOD PRODUCT

BACKGROUND OF THE INVENTION

1. Technical Field

The present invention relates to flavorful coatings for food products, and to processes for preparing the coatings and coated food products.

2. Description of the Background Art

Traditional methods of flavor delivery for coated food products involve the application of seasonings on the products, with oils or gums being used as adhesives. This often results in products that have relatively poor seasoning adhesion, a messy surface residue and potentially high fat content.

Glazes and coatings for food products are known in the art. U.S. Pat. No. 4,762,721 (Holscher et al.) relates to a glazing composition that comprises a homogenized emulsion of protein, edible oil, water and thin-boiling (partially hydrolyzed or otherwise modified) starch. The composition is prepared by forming a paste of the dry ingredients and water and allowing it to stand over night. The paste is then thinned with more water and the oil, stirred intensively for 15–30 minutes, and emulsified under pressure. An alternative process calls for boiling the starch in water, followed by addition of the other ingredients, intensive stirring and emulsification under pressure. Another alternative process consists of dispersing the protein and starch in the oil, followed by the addition of hot water. The mixture is then cooled and homogenized under pressure. There is no mention in this patent of the inclusion of seasoning in this coating.

Another glazing composition is discussed in U.S. Pat. No. 4,645,674 (Lang et al.). The composition comprises water, one or more dextrins, a preservative and a food acid. Coloring or flavoring can also be added, while gums, fats and starches are specifically excluded because glazes comprising these ingredients have not been totally satisfactory in providing an adequate moisture barrier. The Lang invention is purported to provide 1) a coating for baked goods that prevents the passage of moisture between the baked good and any surface icing applied to it, 2) a glazed coating resembling a traditional egg-wash coating and 3) an economical glaze coating that does not liquify over time at elevated humidities.

A moisture barrier for baked and fried food products is also described in U.S. Pat. No. 4,293,572 (Silva et al.). This composition comprises corn syrup solids, water, acetylated monoglyceride and a flavoring. It is produced by forming a water-in-oil emulsion by adding the corn syrup solids and acetylated monoglyceride to boiling water with slow agitation. The coating is not dried, but rather allowed to "set" through hardening of the glyceride upon cooling.

Other disadvantages attach to the use of previously-known coatings and glazes. Such products may not provide uniform coatings, particularly when flavors and particulate seasonings are added. Furthermore, the application methods commonly used tend to impart excessive moisture to the food product, result in loss of coating adhesion, lumping and mottling of the coating, and general product deterioration.

SUMMARY OF INVENTION

In one aspect, the present invention involves the preparation of a starch-based food product coating containing a mixture of seasoning and liquid and dry ingredients that is applied on the product and subsequently dried to provide a smooth flavor coating on the exterior of the product. The coating comprises a mixture of water, at least one edible oil, at least one native starch, at least one seasoning and, optionally, edible protein and an emulsion stabilizer.

Another aspect of the present invention involves a process for preparing such a coating. The process comprises disbursing at least one ungelatinized native starch in warm water, fully hydrating the starch, adding at least one edible oil to the starch and water mixture, preparing an oil-in-water emulsion from the starch, water and oil mixture, adding at least one seasoning to the emulsion, and mixing the resulting composition at a low speed that ensures uniform distribution of solid particles within the composition while minimizing incorporation of air bubbles. No additional heating of the composition during mixing is necessary.

The present invention further provides a process for preparing a coated food product, comprising applying to a food product a flavorful coating composition comprising an oil-in-water emulsion of water, at least one ungelatinized native starch, at least one edible oil and at least one seasoning, subjecting the resulting food product to a drying process comprising a first drying stage subjecting the product to temperature and air flow sufficient to melt fat within the coating but not gelatinize the starch, followed by a second drying stage subjecting the product to temperature and air flow sufficient to gelatinize the starch and thus set the coating.

DETAILED DESCRIPTION

The present invention relates to a starch-based food product coating containing a mixture of seasoning and liquid and dry ingredients that is applied on the product and subsequently dried to provide a smooth flavorful coating on the exterior of the product. The coating comprises a mixture of water, at least one edible oil, at least one native (i.e. chemically unmodified and thus water-insoluble) starch, at least one seasoning and, optionally, edible protein and an emulsion stabilizer.

The native starch is present in the coating formula to serve as a binder, to improve coating adhesion to the base food product, to absorb water and reduce moisture migration into the base product that would otherwise cause soggy texture and to assist in setting the coating structure upon drying. Native (i.e. water insoluble) starch is quickly dispersed (not solubilized) in water, as opposed to some modified starches which solubilize in water causing an increased coating viscosity. Thus, any edible, insoluble starch should function in the present invention.

A relatively large percentage of water in the formula is recommended for starch gelatinization and for producing an appropriate viscosity for application.

An edible oil is added to enhance product flavor by serving as a flavor carrier, to impart desirable mouthfeel of the coated product, to improve the smoothness of the coated product and to solubilize any oil-soluble components in the seasoning. Vegetable oils are preferred, and bland oils such as soybean oil are most referred, as they do not significantly modify the taste of the flavor coating.

Edible protein, such as egg white solids or whey protein concentrates can optionally be added for flavor fixation. An emulsion stabilizer such as lecithin, sodium stearyl lactylate (SSL), sorbitan monostearate, glycerol monostearate, propylene glycol monostearate, sucrose monostearate, ethoxylated monoglycerides (EMGs) or diacetyl tartaric acid esters of mono- and diglycerides (DAEM) can optionally be added to aid in emulsification and maintain emulsion stability. Lecithin is the preferred emulsifier.

Any desired seasoning, including cheese flavor, herbs, butter or honey, can be used, either alone or in combination with another seasoning, in accordance with the present invention. A wide variety of seasoning materials are per se known and suitable for use in the present invention. One preferred embodiment involves the application of the coating composition to a food product wherein the total fat content of the coated food product meets the current U.S. regulatory requirements for "low-fat" products (less than 1.68 g fat per ounce of product). The coating composition of the present invention achieves excellent flavor delivery with a minimum fat content, making it very useful in the preparation of low-fat products.

Table 1 lists ranges and recommended proportions of the principle and optional ingredients of preferred coating compositions. The worker of ordinary skill in the art will be able to adjust these ranges, as necessitated by the choice of specific ingredients, to achieve the desired result of a flavorful food product coating having an appealing appearance and texture.

TABLE 1

| Ingredient | Range %* | Recommended %* |
| --- | --- | --- |
| Seasoning | 25–45 | 36.8 |
| Water | 36–49 | 40.9 |
| Soybean Oil | 10–20 | 16.4 |
| Native Corn Starch | 4–5 | 4.1 |
| Whey Protein Concentrates | 0–3 | 1.6 |
| Lecithin | 0–0.5 | 0.2 |

*Values are percent of total weight of coating composition prior to application to the food product In a preferred embodiment, the coating composition is prepared by disbursing at least one ungelatinized native starch, such as native corn starch, in warm water (ideally 70°–110° F.), fully hydrating the starch. An edible oil, such as soybean oil, is then added to initiate lipid-starch interactions to "coat" the hydrated starch granules. An oil-in-water emulsion is then formed by mixing the water-oil-starch mixture, optionally stabilized by the addition of lecithin. If lecithin is used, it should be well disbursed in the mixture, distributed to the oil/water interface, before the majority of solid ingredients (seasoning) are introduced. Once an emulsion is formed, at least one seasoning is then blended into the mixture to form a suspension of solid particles in the liquid fraction.

Once all ingredients have been added, the coating is further mixed at low speed to ensure uniform distribution of solid particles while minimizing incorporation of air bubbles, which would increase viscosity and make coating application difficult. Inasmuch as incorporation of air bubbles cannot be completely prevented, such incorporation is nonetheless kept to a minimum. Depending on the agitator-type, mixing speed, and kettle size, the total mixing time should be long enough to allow water and oil-soluble materials to be dissolved in their respective fractions, producing a uniform, microstructure. No additional heating of the coating is required for application. Since the coating is made without being subjected to high temperature (above the gelatinization temperature of the starch), the starch is not gelatinized before application, preventing a thick, sticky coating from forming. If left standing, the viscosity of the coating tends to increase and separation of the oil and water components can occur. These can be reversed by renewed agitation. It is thus recommended that agitation of the coating continue throughout the coating process to maintain coating consistency and ease of application.

The coating can be applied to food products in any conventional manner, including via dripping, spraying and misting processes. Products having relatively impermeable shells can be dipped or enrobed with the coating. The worker of ordinary skill in the art will be able to select an application method appropriate for the food product being coated and the type of equipment available. A spray system is recommended for achieving the most uniform coverage of coatings that form less than approximately 12% of the product weight.

The coatings and processes of the present invention are particularly useful for coating baked grain-flour based food products, such as pretzels. Pretzels are relatively hydroscopic and thus benefit from the coatings of the present invention. However, the invention can be effectively employed with a variety of food products, including nuts, popcorn and breakfast cereals.

After coating, the product should be dried to return it to a microbiologically inactive, shelf-stable moisture level. This is best done immediately after coating to minimize moisture diffusion into the product, which would reduce its "crispness." Further, since the coated products tend to become sticky as they stand, it is recommended that they be kept in motion during drying to prevent aggregation and to deliver a free-flowing singulated product. This may be accomplished in per se known ways, such as using fluid-bed, rotary, or vibratory pan drying technologies. Drying is ideally carried out with precise control of the drying profile, as defined by dehydrating temperatures, retention times, and air velocity. The coating should be dried with an initial long time/low temperature drying stage with low air circulation, followed by a short time/high temperature finish drying stage with high air circulation. A low temperature/long time drying stage, with relatively low air flow velocity, allows melting of any solid fat in the coating composition or near the surface of the portions of the food product in contact with the coating to be completed while the coating structure remains unset. High temperature finish drying with increased air flow then sets the coating structure to produce a smooth product appearance. The temperature during the initial drying stage should not exceed the gelatinization temperature of the starch, but should be higher than the fat-melting point of the fat present in the food product or coating. The temperature of the second drying stage should exceed the gelatinization temperature of the native starch employed in the coating. This two-stage drying process prevents lumpy, mottled, or greasy appearance of the coating caused by uneven distribution of melted fat underneath an already-hardened coating shell, while at the same time preventing separation of the coating emulsion from the food product and general product deterioration.

Optionally, additional flavor coating, such as seasoning powder, can be applied by per se known methods after the drying process to impart an initial or additional flavor impact upon consumption of the coated food product.

In those embodiments wherein the coating composition contains little or no fat, the temperatures of the two drying stages can be very close, or the same, without significant negative impact on the quality of the food product or coating.

Gelatinization of the starch during drying of the coating is necessary in order to provide necessary adhesion for the coating. The resulting product is neither sticky nor messy to the touch, and has a smooth appearance with good seasoning adhesion. The coating and application process permit production of a food product that has a major initial flavor hit and a texture consistent with uncoated food products of the same kind.

The following Examples are meant to illustrate, but in no way to limit, the scope of the claimed invention.

EXAMPLE 1

Flavorful coatings were prepared using the following ingredients in the indicated weight proportions:

| Ingredient | Range %* |
| --- | --- |
| Seasoning | 39.5% |
| Water | 35.0% |
| Soybean Oil | 17.3% |
| Native Corn Starch | 4.5% |
| Egg White Solids | 3.5% |
| Lecithin | 0.2% |

Coatings were prepared using cheddar cheese, garlic butter, and honey mustard as seasonings.

The native corn starch was first dispersed in approximately 110° F. water in a mixer, and was soon fully hydrated. The soybean oil was then added with mixing to form an oil-in-water emulsion. A hydrophilic lecithin was then added and well dispersed in the mixture so as to be distributed to the oil/water interface. The seasoning was then blended into the emulsion to form a suspension of solid particles in the liquid fraction. The coating composition was then further mixed at low speed to ensure uniform distribution of solid particles while minimizing incorporation of air bubbles. The mixing process was carried out without additional heating. It was found that with dairy-based ingredients, undesirable skin formation, due to protein denaturation occurred above 125° F. coating temperature.

EXAMPLE 2

The coating compositions of Example 1 were applied to tiny twist pretzels by spraying in a tumbler and drying in a Wolverine fluid-bed dryer (Model SN Jetzone). For the cheddar flavored and garlic butter flavored coatings, both relatively high in fat, an initial drying stage of 170° F. for 4 minutes with low air velocity was used. This initial drying stage resulted in the uniform melting of the fat in the coating and its distribution across the product surface before the coating set. It is hypothesized that the motion of the product in the fluid bed aids in the uniform distribution of melting fat at this stage. A second drying stage of 270° F. for another 4 minutes with high air velocity was then used to gelatinize the starch and set the coating.

For the honey mustard flavored coating, which has a significantly lower fat content, higher sugar content and more volatile flavor compounds, a low drying temperature was used in both the first and second drying stages. This prevented volatilization of flavor components and caramelization of the sugar content.

The result with all three flavor coatings was a pretzel with a smooth, uniform coating.

EXAMPLE 3

Tiny twist pretzels were coated with the compositions of Example 1 and dried in a Wenger coating/drying drum (3 ft.×9 ft. size). The Wenger unit involves heating of the coated product while the product is being tumbled and the individual pieces rub against each other. The drying temperature increased from 106° F. in the first drum zone to 177° F. in the second drum zone to 193° F. in the last drum zone. The drum rotation speed was 9 rpm. While similar to the drying profile in the Wolverine dryer, the lower temperatures in the Wolverine unit allowed greater flexibility with the drying conditions selected. The lower temperatures were combined with lower air flow (about 3 times lower than in the Wolverine unit). The initial heat in the first drum zone caused the fat to melt, while the tumbling action enhanced and accelerated the even distribution of fat across the product surface. For all three coating flavors, it was found that the maximum temperature should not exceed 250° F., with a residence time of 3–6 minutes, and a maximum air flow of 650 fpm.

The result with all three flavor coatings was a pretzel with a smooth, uniform coating.

We claim:

1. A process for preparing a coated food product, comprising
   a) applying to a food product a flavorful coating composition, comprising an oil-in-water emulsion comprising water, at least one ungelatinized native starch, at least one edible oil and at least one seasoning and
   b) subjecting the resulting food product to a drying process comprising
      a first drying stage subjecting the product to temperature and air flow sufficient to melt fat within the coating but not gelatinize the starch, followed by
      a second drying stage subjecting the product to temperature and air flow sufficient to gelatinize the starch and thus set the coating.

2. A process of claim 1 wherein the food product is a baked food product that is baked before application of the coating composition.

3. A process of claim 1 wherein the coating composition is prepared by mixing at a mixing speed sufficiently low to minimize incorporation of air bubbles into the composition.

4. A process of claim 1 wherein the temperature of the first drying stage is substantially the same as the temperature of the second drying stage.

5. A process of claim 1 wherein the seasoning constitutes between about 25% and 45% of the weight of the coating composition.

6. A process of claim 5 wherein the seasoning constitutes about 36.8% of the weight of the coating composition.

7. A process of claim 1 wherein the water constitutes between about 36% and 49% of the weight of the coating composition.

8. A process of claim 7 wherein the water constitutes about 40.9% of the weight of the coating composition.

9. A process of claim 1 wherein the edible oil constitutes between about 10% and 20% of the weight of the coating composition.

10. A process of claim 9 wherein the edible oil constitutes about 16.4% of the weight of the coating composition.

11. A process of claim 1 wherein the ungelatinized native starch constitutes between about 4% and 5% of the weight of the coating composition.

12. A process of claim 11 wherein the ungelatinized native starch constitutes about 4.1% of the weight of the coating composition.

13. A process of claim 1 wherein the coating composition further comprises edible protein.

14. A process of claim 13 wherein the edible protein is selected from the group comprising egg white solids and whey protein concentrates.

15. A process of claim 1 wherein the coating composition further comprises an emulsion stabilizer.

16. A process of claim 15 wherein the emulsion stabilizer is lecithin.

17. A process of claim 1 wherein the total fat content of the food product and the coating composition when applied to the food product does not exceed 1.68 g of fat per ounce of coated food product.

18. A process of claim 1 wherein the ungelatinized native starch is ungelatinized native corn starch.

* * * * *